(12) United States Patent
Miyamaru

(10) Patent No.: US 6,717,605 B2
(45) Date of Patent: Apr. 6, 2004

(54) FOCAL POSITION ADJUSTING APPARATUS, EXPOSURE HEAD, AND IMAGE RECORDING APPARATUS

(75) Inventor: Fumiaki Miyamaru, Osaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 45 days.

(21) Appl. No.: 10/021,309

(22) Filed: Dec. 19, 2001

(65) Prior Publication Data

US 2002/0106204 A1 Aug. 8, 2002

(30) Foreign Application Priority Data

Dec. 19, 2000 (JP) .......................................... 2000-385063

(51) Int. Cl.$^7$ ............................................... B41J 27/00
(52) U.S. Cl. ....................................... 347/241; 347/256
(58) Field of Search ................................. 347/241, 242, 347/214, 256, 257, 258; 359/637, 814, 319

(56) References Cited

U.S. PATENT DOCUMENTS

| | | | |
|---|---|---|---|
| 5,124,835 A | * 6/1992 | Shibaguchi et al. | ........ 359/319 |
| 5,923,480 A | * 7/1999 | Labeye | ........................ 359/814 |
| 5,995,292 A | * 11/1999 | McDonald | ................... 359/637 |

FOREIGN PATENT DOCUMENTS

JP     11281870 A  * 10/1999  ............ G02B/7/04

\* cited by examiner

*Primary Examiner*—Hai Pham
(74) *Attorney, Agent, or Firm*—Sughrue Mion, PLLC

(57) ABSTRACT

This invention relates to a focal position adjusting apparatus having a lens which converges an electromagnetic wave to a focal position; first electrodes fixed to the lens; second electrodes being opposed arranged so as to be spaced apart from each of the electrodes in the optical axis direction of the lens; a power supply which supplies variable voltage which applies voltage to the first electrodes and the second electrodes and a biasing unit which biases the lens in a direction using an attractive force caused by static electricity between each of the first and second electrodes and the opposed electrodes caused by the application of a voltage.

23 Claims, 5 Drawing Sheets

FOCAL POSITION ADJUSTING APPARATUS, EXPOSURE HEAD, AND IMAGE RECORDING APPARATUS

BACKGROUND OF THE INVENTION

1. Field of the Invention

The present invention relates to image recording using exposure technology. More specifically, this invention relates to a focal position adjusting apparatus capable of appropriately forming an image focusing light beam at a predetermined position in multi-channel image exposure, and an exposure head and an image recording apparatus using the same.

2. Description of the Related Art

In various printers and copying machines, etc., an exposure apparatus is used, which performs scanning exposure on a photosensitive material, such as a silver salt photographic photosensitive material or an electro-photographic photosensitive material, using a recording light modulated in accordance with an image to be recorded.

At present, the dominating exposure apparatus is popular which performs, so-called, light beam scanning exposure. In such an exposure apparatus, a light beam modulated in accordance with the image to be recorded is deflected to a main scanning direction. The relative movement between the photosensitive material and the light beam is effected in a sub scanning direction being perpendicular to the main scanning direction, so that two-dimensional scanning exposure of the photosensitive material by the light beam is effected thereby recording the image.

Accompanying with improvement of recent technology in this field, it has become possible to rapidly record a high quality image by such light beam scanning exposure. However, image exposure by light beam scanning has limitation to increasing of image exposure speed and improvement in resolution. Particularly, in the case of forming a large image, which will find a large range of uses in the field of printing or the like, it is rather difficult to rapidly record an image of higher quality using image exposure by light beam scanning.

As a method of overcoming such a problem to make it possible to rapidly perform high quality image recording, a multi-channel image exposure technique is known, according to which exposure is simultaneously effected on a photosensitive material with a plurality of light beams, i.e., multi-beam modulated independently.

As schematically shown in FIG. 7, in such a multi-beam image exposure technique, an image is usually formed at a predetermined exposure position (recorded surface) X with all the light beams L (indicated by dashed lines) using a single image formation lens (image formation lens unit) 100.

Further, when a focal position adjusting function is introduced into the multi-beam exposure optical system, the image formation lens 100 is moved toward in the optical axis direction as indicated by the dotted lines in the drawing, so that the focal position of the light beams L is adjusted.

However, in this method, any difference in image forming position between the light beams (individual channels) cannot be corrected. A light beam occurs, which does not accurately form an image at the exposure position X, even if focal position adjustment is performed. Also even when the image formation lens 100 is inclined with respect to the optical axis due to assembly error, there is difference in focal position adjustment amount between the light beams, owing that a light beam occurs, which does not accurately form an image at the exposure position X.

Such difference in image forming condition between the light beams at the exposure position X will lead to a deterioration of image quality, such as image blurring.

SUMMARY OF THE INVENTION

In order to overcome the above problem of the above conventional art, it is an object of the present invention to provide a focal position adjusting apparatus which, in multi-beam exposure using a plurality of light beams, accurately performs focal position adjustment independently on each light beam (each channel), thereby making it possible to correct exposure using all the light beams. The present invention further has an object to provide a multi-channel exposure head utilizing this focal position adjusting apparatus, and an image recording apparatus utilizing such an exposure head.

According to a first aspect of this invention, a focal position adjusting apparatus is provided, comprising: a lens which converges electromagnetic wave to a focal position; first electrodes fixed to the lens; second electrodes being opposed which spacingly sandwiches each of the first electrodes, in an optical axis direction of the lens; and a biasing unit which biases the lens in a direction of an attractive force caused by static electricity between the first electrodes and the second electrodes caused by applying variable voltage to the first electrodes and the second electrodes.

Further it is preferable in the first aspect that the focal position adjusting apparatus, the lens being displaced using the force caused by the static electricity in the optical axis direction thereby adjusting the focal position on which the electromagnetic wave is converged.

Further it is preferable in the first aspect that the focal position adjusting apparatus according to claim 1, the biasing device being formed by a third electrode arranged on the opposite side of the second electrodes which are sandwiched by the first electrodes.

Further it is preferable in the first aspect that the focal position adjusting apparatus, the biasing device being formed by an elastic member and a power supply which applies voltage across the first electrodes and the second electrodes and a third electrode.

Further it is preferable in the first aspect that the focal position adjusting apparatus, the first and second electrodes and the opposed electrodes being ring-shaped.

Further it is preferable in the first aspect that the focal position adjusting apparatus is plurally arranged.

According to a second aspect of this invention, an exposure head is provided, comprising a focal position adjusting apparatus being plurally arranged, including: a lens which converges electromagnetic wave to a focal position; first electrodes fixed to the lens; second electrodes being opposed which spacingly sandwiches the first electrodes in an optical axis direction of the lens; and a biasing unit which biases the lens in a direction of an attractive force caused by static electricity between the first electrodes and the second electrodes caused by applying variable voltage to the first electrodes and the second electrodes, and a light source section which makes light beams incident on one lens or more of the focal position adjusting apparatus and which can modulate each of light beams independently.

According to a second aspect of this invention, an exposure head is provided comprising: an exposure head; and a scanning unit; the exposure head having a focal position adjusting apparatus being plurally arranged including, a lens which converges electromagnetic wave to a focal position; first electrodes fixed to the lens; second electrodes being opposed which spacingly sandwiches the first electrodes, in an optical axis direction of the lens; and a biasing unit which biases the lens in a direction of an attractive force caused by static electricity by applying variable voltage to the first electrodes and the second electrodes, and a light source section which making light beams incident on one lens or more of the focal position adjusting apparatus and which can modulate each of light beams independently, and the scanning unit displacing a photosensitive material with relative to the exposure head.

BRIEF DESCRIPTION OF THE DRAWINGS

FIGS. 1A, 1B, and 1C are conceptual drawings showing an example of the focal point position adjusting apparatus of the present invention, of which FIG. 1A is a front view, FIG. 1B is a side view, and FIG. 1C is a plan view;

FIG. 2A is a front view, FIG. 2B is a plan view, and FIG. 2C is a plan view of still another example;

FIG. 3A is a front view, FIG. 3B is a plan view, FIG. 3C is a plan view of a opposed electrode, and FIG. 3D is a plan view of still another example;

FIG. 5A is a conceptual drawing, and FIGS. 5B and 5C are diagrams showing an example of the way the focal position adjusting apparatuses thereof are arranged;

FIG. 6A is a plan view, and FIG. 6B is a side view.

DESCRIPTION OF THE PREFERRED EMBODIMENTS

Preferred embodiments of the focal position adjusting apparatus, exposure head, and image recording apparatus of the present invention will now be described in detail with reference to the accompanying drawings.

While the present invention is depicted as applied to the focal position adjustment of light beams in the following description, the present invention is not limited. The present invention is also applicable to focal or convergence position adjustment of various electromagnetic waves, such as ultraviolet rays, infrared rays, and X-rays except for light.

Figure 1A:
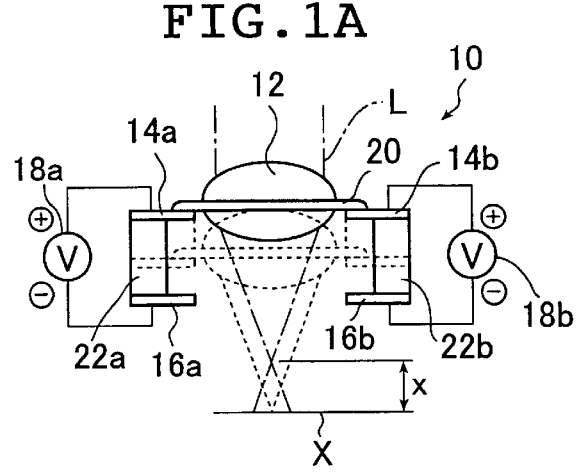
Figure 1B:
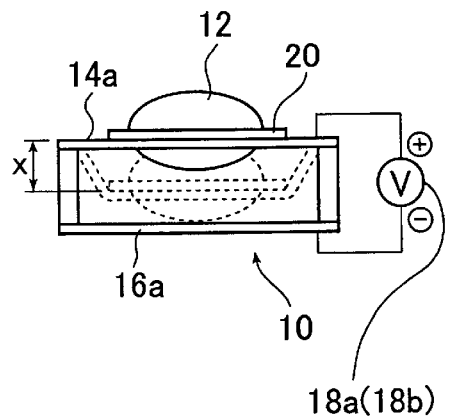
Figure 1C:
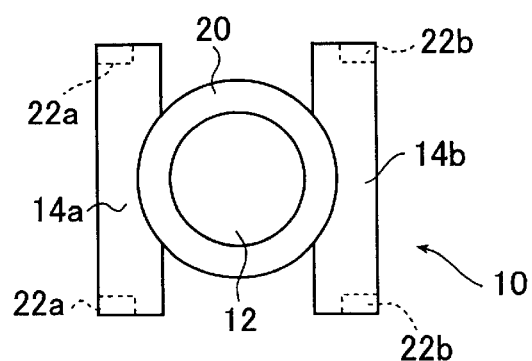

FIG. 1A to FIG. 1C are conceptual drawings showing an example of the focal position adjusting apparatus of the present invention.

FIG. 1A is a front view, FIG. 1B is a side view obtained by rotating FIG. 1A by 90 degrees about the optical axis, and FIG. 1C is a plan view as viewed from the optical axis direction.

In the focal position adjusting apparatus 10 shown in FIGS. 1A to 1C (hereinafter referred to as the adjusting apparatus 10), a lens 12 (e.g., a micro lens having a diameter of 300 $\mu$m) is moved in the optical axis direction (i.e., vertically in FIG. 1A and FIG. 1B, and perpendicularly to the plane of the drawing paper in FIG. 1C) thereby adjusting the focal position of one of light beams such as laser beams emitted, for example, from a multi-channel light source. The apparatus substantially has the lens 12, electrodes 14a,14b opposed electrodes 16a,16b, and driving power supplies 18a,18b.

In the shown adjusting apparatus 10, the lens 12 is held by a holder 20 which is a disc-like plate member having a through-hole at the center such as a bulk of a section of donut.

The electrodes 14a,14b are formed as rectangular plates and have elasticity such that plate springs have (That is, they also serve as a biasing device against an electrostatic force in the present invention). The opposed electrodes 16a,16b essentially have configuration substantially as same as the electrodes 14a,14b have.

Spacers 22a and 22b are inserted between the longitudinal ends of the electrodes 14a,14b and the opposed electrodes 16a,16b which are mutually corresponded, spacing electrodes apart from each other by a predetermined gap by the spacers 22a,22b. Namely, at the longitudinal ends, the spacers 22a,22b support the electrodes 14a,14b from the downstream side with respect to the direction in which the light beam L travels (hereinafter referred to as "downstream"), bridges being formed by the electrodes 14a,14b and the spacers 22a,22b.

Using this construction, opposed electrode pairs are formed, spacing apart from each other, one pair formed by the electrode 14a and the opposed electrode 16a, the other pair consisting of the electrode 14b and the opposed electrode 16b. Driving power supplies 18a and 18b are respectively connected to the electrode pairs.

The driving power supplies 18a, 18b can vary application voltage.

Since the opposed electrodes 16a,16b are secured at predetermined positions, the electrodes 14a,14a, in other words, the two bridges, are arranged in parallel with a predetermined gap corresponding to a size of the lens 12.

The lens 12 built in the holder 20 is secured in position, disposing its disc surface on the central portions of the electrodes 14a,14b (the two bridges). That is, the electrodes 14a,14b and the opposed electrodes 16a,16b are mutually spaced apart in the optical axis direction of the lens 12.

In the adjusting apparatus 10 like this, an MEMS (micro electronic mechanical system) utilizing electrostatic force is formed by way of the electrodes 14a,14b and the opposed electrodes 16a,16b, spaced apart from each other by way of the spacers 22a,22b, and the driving power supplies 18a, 18b.

The adjusting apparatus 10 (including the multi-channel mode described below) is produced by a well-known method of utilizing manufacturing methods for semiconductor devices or MEMS, etc.

When the driving power supplies 18a,18b are not being activated (i.e., the driving power supplies 18a,18b lie in OFF-status) in the adjusting apparatus 10 shown, no force is applied to between the electrodes 14a,14b and the opposed electrodes 16a,16b. Thus, the lens 12 built in the holder 20 lies in the state indicated by the solid line in FIG. 1, that is, it is simply placed on the electrodes 14a,14b formed by plate springs.

When the driving power supplies 18a,18b are activated (i.e., the driving power supplies 18a,18b are turned on), and a voltage is applied to between the electrodes 14a,14b and the opposed electrodes 16a,16b, an attractive force caused by static electricity occurs between them. As above-mentioned, the opposed electrodes 16a,16b are fixed, whereas the electrodes 14a,14b are elastic like plate springs, so that the electrodes 14a,14b are pulled by the opposed electrodes 16a,16b and bent due to the attractive force generated therebetween as indicated by the dotted line in the drawing, owing that the lens 12 built in the holder 20 disposed on the electrodes 14a,14b moves in the optical axis direction. Owing to the elasticity of the electrodes 14a,14b, the amount of motion of the lens can be adjusted according to the applied voltage.

Thus, in the state in which the driving power supplies 18a,18b lie in OFF-status, if the focal position of the lens 12 is offset by a distance x with respect to the exposure position X, the focal position of the lens 12 can be adjusted to the exposure position X as indicated by the dotted line in the drawing by applying a voltage by the driving power supplies 18a,18b for moving the lens 12 by this distance x utilizing elasticity of the electrodes 14a,14b.

Thus, in the focal position adjusting apparatus of the present invention, the lens can individually be moved, utilizing the MEMS based on electrostatic force. By applying the apparatus, e.g., to an optical system which performs multi-channel exposure with a plurality of light beams, focal adjustment can individually be performed for each channel (light beam), so that high-image-quality and multi-channel exposure can be realized in which image of all the light beams is correctly formed.

Further, the adjusting apparatus of the present invention, capable of being realized by the MEMS which utilizes static electricity, can easily be made compatible with a multi-channel system at low cost.

Figure 2A:
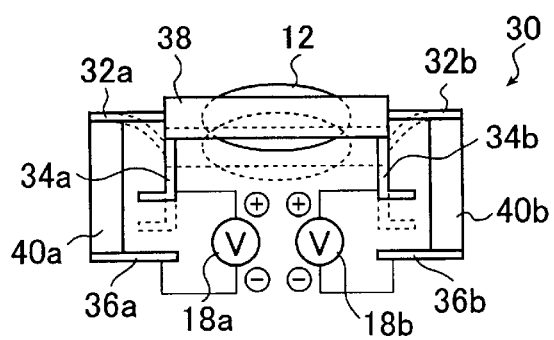
FIGS. 2A, 2B, and 2C are conceptual drawings showing another example of the focal position adjusting apparatus of the present invention.
Figure 2C:
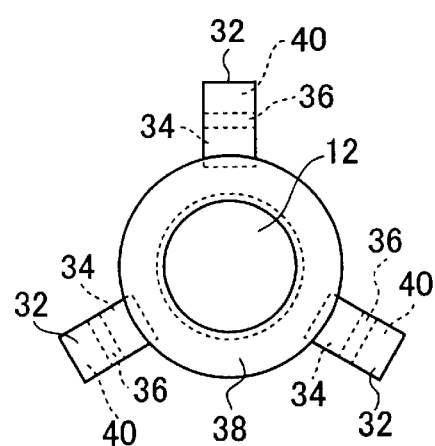
Figure 2B:
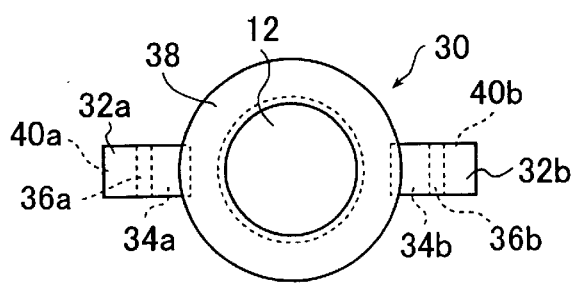

FIGS. 2A and 2B are conceptual drawings showing a focal position adjusting apparatus according to another embodiment of the present invention. FIG. 2A is a front view. FIG. 2B is a plan view. In this embodiment, the components as same as those of FIG. 1 are indicated by the same reference numerals, and following description is mainly concerned with components which have not yet been mentioned.

In the above-described embodiment, the electrodes 14a, 14b used for plate springs, serve as biasing devices against the attractive force between each of the electrodes 14a,14b and the opposed electrodes 16a,16b, the biasing devices (plate springs 32a,32b) and the electrodes 34a,34b in the focal position adjusting apparatus 30 (hereinafter referred to as the adjusting apparatus 30) shown in FIG. 2 are prepared as separate components.

The adjusting apparatus 30 substantially has the lens 12, the plate springs 32a,32b, the electrodes 34a, 34b, the opposed electrodes 36a and 36b, and the driving power supplies 18a,18b.

In the adjusting apparatus 30, the lens 12 is held by a substantially cylindrical holder 38 having a through-hole at its center, with the optical axis substantially coinciding with the central axis of cylinder of the holder 38.

The cylindrical side surface of the holder 38 are substantially rectangular plate springs 32a and 32b, the surfaces of which extend perpendicularly to the axis (optical axis) so as to diametrically hold the holder 38 on either side, with their end surfaces opposed to each other.

Further, electrodes 34a,34b are disposed vertically to the lower side of the holder 38 at positions corresponding to the plate springs 32a,32b. The electrodes 34a,34b are formed by bending plate materials in a substantial L-shaped manner, and the forward end portions formed by bending are directed outwards, with the top portions of the L-shaped electrodes being abutted and joined to the lower side of the holder 38.

The external end portions of the plate springs 32a,32b are fastened to spacers 40a,40b so as to be supported from the downstream side.

Opposed electrodes 36a and 36b substantially have configuration as same as the plate springs 32a,32b at a lower end of the spacers 40a,40b. The opposed electrodes 36a,36b are secured at predetermined positions so that the plate springs 32a,32b are overlapped in the optical axis direction. The size of the spacers 40a,40b measured in the optical axis direction defined by such a size that, even when the focal position is adjusted to maximum, the lower surfaces of the electrodes 34a,34b do not come into contact with the opposed electrodes 36a,36b, and such that, even when the voltage applied by the driving power supplies 18a,18b is adjusted to minimum, the requisite static electricity occurs between the electrodes 34a,34b and the opposed electrodes 36a,36b (that is, they are not spaced apart from each other to such a degree not to necessitate the application of large voltage).

Like the above-described example, electrode pairs in which electrodes are spaced apart from and opposed to each other, are formed by the electrode 34a and the opposed electrode 36a and by the electrode 34b and the opposed electrode 36b. The driving power supplies 18a,18b with variable application voltage are respectively connected to the electrode pairs.

Thus, in this example also, the MEMS utilizing electrostatic force is formed by the plate springs 32a,32b, the electrodes 34a,34b, the opposed electrodes 36a,36b, and the driving power supplies 18a,18b.

In the above-described example, when no force is applied to between each of the electrodes 34a,34b and the opposed electrodes 36a,36b, in the OFF-status of the driving power supplies 18a,18b in the adjusting apparatus 30, the lens built in the holder 38 is at the position indicated by the solid line in FIG. 2A.

As in the above-described embodiment, when the driving power supplies 18a,18b are turned on, an attractive force caused by static electricity occurs between each of the electrodes 34a, 34b and the opposed electrodes 36a,36b, and the electrodes 34a, 34b are pulled by the stationary opposed electrodes 36a,36b. As a result, as indicated by the dotted line in FIG. 2A, the plate springs 32a,32b are bent by an amount depending on the electrostatic force generated or application voltage and resiliency of the plate springs 32a, 32b, and the lens 12 moves in the optical axis direction depending on the bending amount thereby adjusting the focal position.

In the adjusting apparatus 30 shown in FIGS. 2A and 2B, the lens 12 built in the holder 38 is supported diametrically at two supporting points by the plate springs 32a,32b, the lens 12 cannot sometimes be supported in a manner stable enough for this construction.

In this case, as shown in the plan view in FIG. 2C, it is possible to support the holder 38 using the plate springs 32a,32b at three points at interval formed by 120 degrees. The electrodes 34a,34b, the spacers 40a,40b, and the opposed electrodes 36a,36b, etc. are arranged. It is also possible, if necessary, to support the lens 12 built in the holder 38 at four or more points similarly.

Figure 3A:
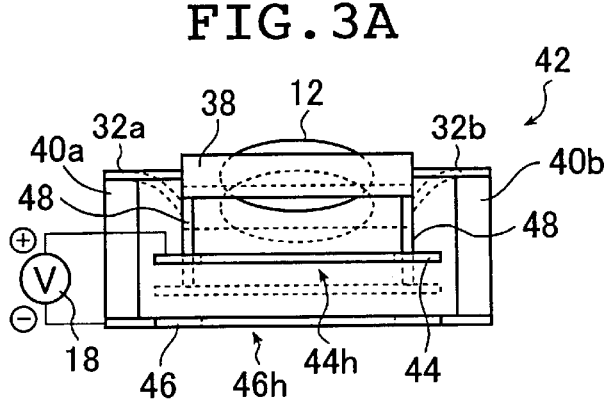
FIGS. 3A, 3B, 3C, and 3D are conceptual drawings showing still another example of the focal position adjusting apparatus of the present invention.
Figure 3D:
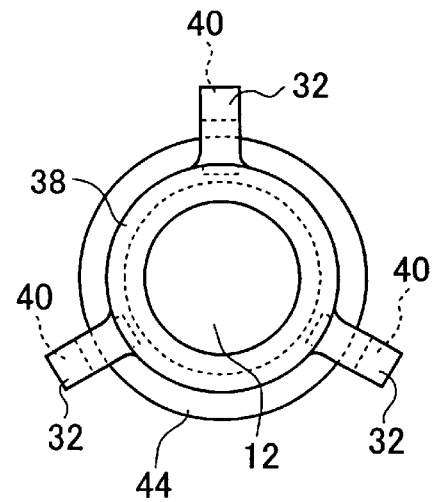
Figure 3B:
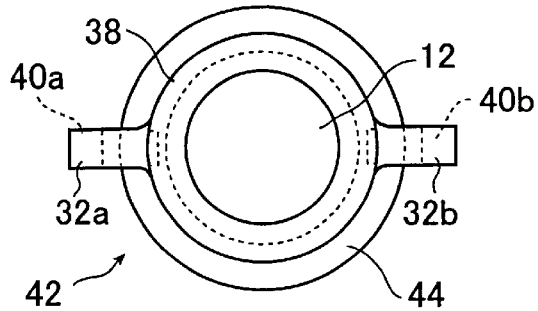

FIGS. 3A and 3B are conceptual drawings showing a focal position adjusting apparatus according to still another embodiment of the present invention. FIG. 3A is a front view, and FIG. 3B is a plan view.

The focal position adjusting apparatus 42 shown in FIGS. 3A and 3B (hereinafter referred to as the adjusting apparatus 42) has a construction as same as that shown in FIG. 2A and FIG. 2B except a section where the electrodes 40a,40b and the opposed electrode 46 are formed as rings. Thus, the same components will be indicated by the same reference numerals, and the following description will be mainly concerned with components which have not yet been mentioned.

The adjusting apparatus 42 shown in FIGS. 3A and 3B substantially has the lens 12, the plate springs 32a and 32b, the electrode 44, the opposed electrode 46, and the driving power supply 18a,18b.

Also in the adjusting apparatus 42, similarly to the above-mentioned embodiment, the lens 12 is held by the substantially cylindrical holder 38, and the plate springs 32a,32b are secured to the side surface of the holder 38 so as to diametrically hold it.

In this example, support members 48 are disposed vertically to the positions of the lower surface of the holder 38 corresponding to the plate springs 32a,32b, the electrode 44 being fastened to the lower ends of the support members. In the example shown, the electrode 44 is a ring-like (donut-shaped or annular) plate member having a through-hole 44h whose center coincides with the optical axis of the lens 12 and whose diameter is larger than that of the lens 12.

As stated in the above-described embodiments, the external end portions of the plate springs 32a,32b are fixed to the spacers 40a,40b.

Figure 3C:
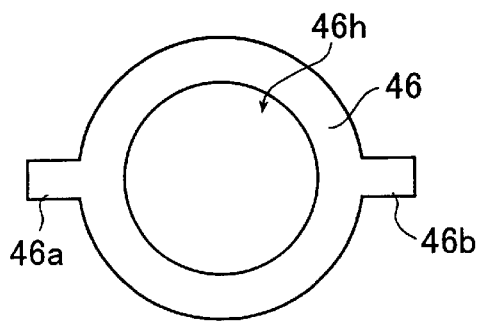

In the example shown in FIGS. 3A and 3B, the opposed electrode 46 is arranged underneath the spacers 40a,40b. As shown in FIG. 3C, which is a plan view, the opposed electrode 46 is a ring-like plate member having a through-hole 46h and a configuration substantially as same as the electrode 44; it is secured in position, with its center coinciding with that of the electrode 44. This opposed electrode 46 has on its outer edge rectangular protrusions 46a and 46b diametrically opposed to each other, the spacers 40a,40b being disposed on these protrusions 46.

An electrode pair in which electrodes are spaced apart from and opposed to each other is formed by the electrode 44 and the opposed electrode 46, and the driving power supply 18a,18b with variable application voltage is connected to this electrode pair. Thereby in the above-described embodiments, an MEMS utilizing electrostatic force is formed by the plate springs 32a,32b, the electrode 44, the opposed electrode 46, and the driving power supply 18a, 18b.

As stated in the above-described embodiments, in the adjusting apparatus 42, when the driving power supplies 18a,18b lies in the OFF status, the lens 12 build in the holder 38 lies at the position indicated by the solid line in FIG. 3A.

When the driving power supplies 18a,18b are turned on, an attractive force occurs between the electrode 44 and the opposed electrode 46, and the electrode 44 is pulled by the opposed electrode 46. Thus, the plate springs 32a,32b are bent by an amount corresponding to the generated electrostatic force and the resiliency of the plate springs 32a,32b, as indicated by the dotted line, and the lens 12 moves in the optical axis direction depend on this amount thereby adjusting the focal position.

Since this adjusting apparatus 42 uses the ring-like electrode 44 and the opposed electrodes 46, the electrostatic force is uniformly applied to over the entire area of the electrodes. That is, it is possible to move the lens 12 built in the holder 38 with a generally uniform force, and the lens 12 moves in the optical axis direction in a satisfactory manner without the lens 12 inclined, whereby it is possible to adjust the focal position with higher accuracy.

In the example shown in FIG. 3 of the embodiment shown in FIG. 3, when stability cannot be achieved by supporting at two points, it is possible to effect supporting at three points at intervals of 120 degrees, as shown in FIG. 3D. It is also possible, if necessary, to support the lens 12 built in the holder 38 at four or more points similarly.

In the above-described examples plate springs are used as biasing devices for biasing the lens 12 built in the holder 38 in a direction reverse to the attractive force caused by the static electricity generated between the electrode and the opposed electrode, this should not be construed restrictively. In the present invention, examples of the elastic member that can be used as the biasing device include various type of springs, such as a coil spring, and various material having rubber resiliency formed by resin or the like.

Figure 4:
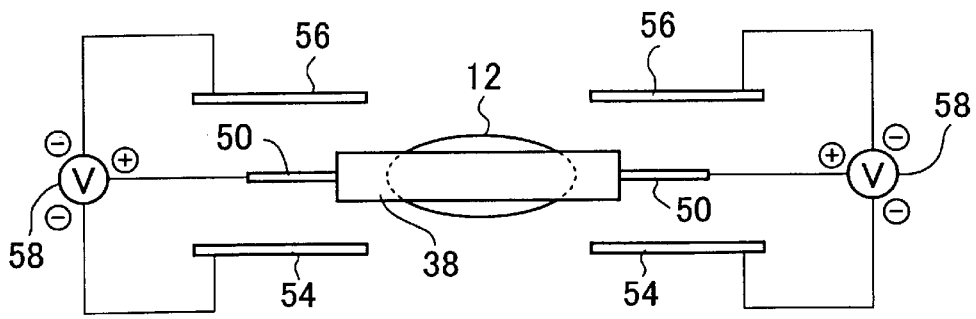
FIG. 4 is a conceptual drawing showing still another example of the focal position adjusting apparatus of the present invention.

Further, in the present invention, it is possible to utilize, instead of an elastic member, static electricity as the biasing device. FIG. 4 is a conceptual drawing showing an example of such a construction.

In the example shown in FIG. 4 (front view), the lens 12 is held by the substantially cylindrical holder 38 similar to those of the examples shown in FIG. 2, etc. If necessary, the holder 38 may be supported using a well-known method by various type of guide members, frames or the like such that the holder 38 can move in the optical axis direction.

Plate-like electrodes 50 are fixed to the cylindrical side surface of the holder 38 diametrically hold the holder 38 in the same manner of the above-described plate springs 32a, 32b. Further, on either side of the electrodes 50 in the optical axis direction, there are provided opposed electrodes 54 on the downstream side and third electrodes 56 on the upstream side, being spaced apart from each other by a predetermined distance.

Further, driving power supplies 58 are connected to the electrodes. The opposed electrodes 54 and the third electrodes 56 are connected to power supplies of the same polarity (which is a negative polarity in the example shown). Thus, in this example, two electrode pairs are formed, being spaced apart from each other in the optical axis direction by the opposed electrodes 54 and the third electrodes 56 and the electrodes 50 therebetween.

Namely, in the example shown in FIG. 4, the lens 12 is biased using an attractive force caused by static electricity occurred between the electrodes 50 and the third electrodes 56 in a direction opposite to the attractive force caused by the static electricity occurred between the electrodes 50 and the opposed electrodes 54.

According to this construction, an amount of static electricity, namely, attractive force occurred between the two electrode pairs is adjusted by balancing of the power supplied to the opposed electrodes 54 and the third electrodes 56, so that it is possible to adjust the position of the lens 12, i.e., the focal position of the lens 12 in the optical axis direction.

A focal position adjusting apparatus according to further aspect of the present invention is for multi-channel exposure. It is a focal position adjusting apparatus formed by arranging a plurality of focal position adjusting apparatuses of the present invention as shown in FIG. 1 to FIG. 4, each intended for a single light beam L (hereinafter, this apparatus will be referred to as the multi-channel adjusting apparatus).

As described with reference to FIG. 1 to FIG. 4, the focal position adjusting apparatus of the present invention is capable of independently adjusting the focal position of a light beam L for one lens 12. Thus, the multi-channel adjusting apparatus of the present invention is capable of independently adjusting the focal position of each light beam in multi-channel exposure, making it possible to realize high-quality image exposure.

The exposure head of the present invention is obtained by combining the above multi-channel adjusting apparatus with a multi-channel light source emitting a plurality of light beams allowing individual modulation.

Figure 5A:
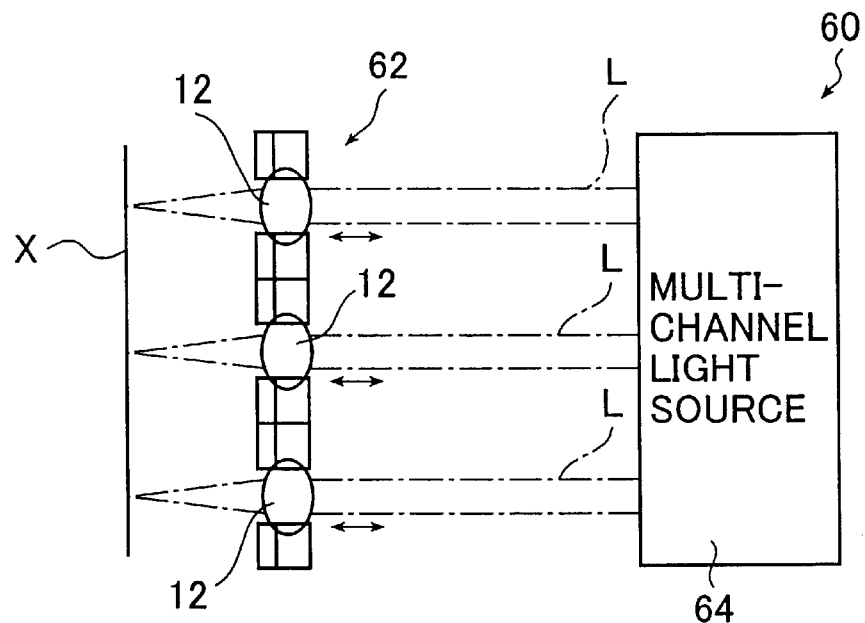
FIGS. 5A, 5B, and 5C are diagrams showing an example of the exposure head of the present invention.

FIG. 5A is a conceptual drawing showing an example of the exposure head.

FIG. 5A shows an exposure head 60 having a combination of a multi-channel adjusting apparatus 62 according to the present invention in which arranged are a plurality of focal adjusting apparatuses in each of which the lens 12 is moved in the optical axis direction as indicated by arrows in the drawing to perform focal position adjustment for a single light beam L, and a multi-channel light source 64 for causing light beams L that can be independently modulated to impinge upon the lenses 12 of the multi-channel adjusting apparatus 62.

While FIG. 5A shows a three-channel exposure head, it is needless to say that the present invention is not limited thereto.

In the exposure head 60 (multi-channel adjusting apparatus 62) of the present invention, there is no particular limitation of arrangement of the individual focal position adjusting apparatus corresponded to one light beam. Various modifications are possible according to a number of channels, recording density, construction of an optical system arranged on the downstream side of the exposure head, etc.

Figure 5B:
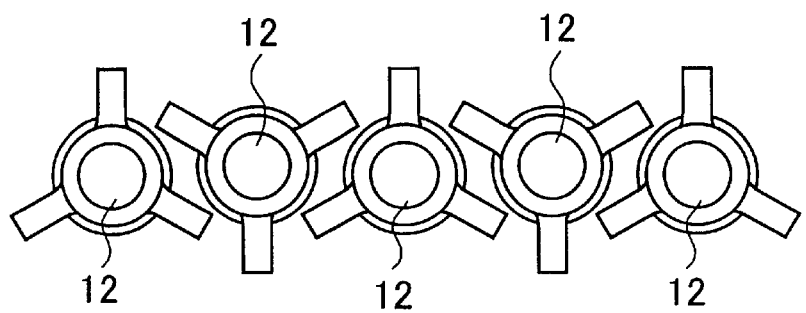
Figure 5C:
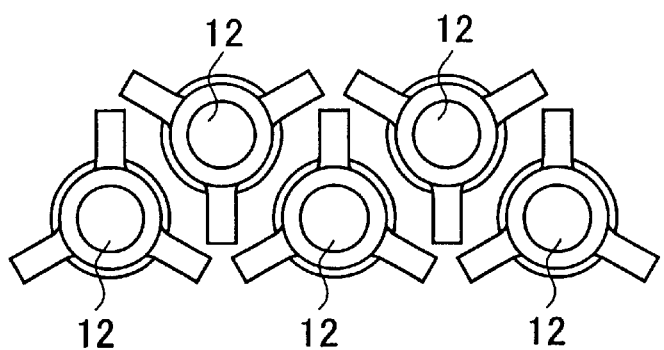

For example, it is possible, as shown in FIG. 5B by exemplifying the above-mentioned FIG. 3D, to arrange the optical axes of the respective lenses 12 in a straight line in the closed packing state corresponding to the construction of the individual focal position adjusting apparatuses. It is also possible to arrange them in a plurality of rows as shown in FIG. 5C.

Further, there is no particular limitation to the multi-channel light source 64 used for the exposure head 60. For example, a multi-channel light source can be used having a combination of a BLD (broad area LD) and a space modulator such as a liquid crystal shutter array, or a multi-channel light source using a plurality of fiber couple LDs having LDs and optical fibers.

The exposure head of the present invention like this is applicable to various type of image recording apparatuses, such as a CTP (computer to plate), an image setter, a DDCP (digital direct color proof), a printer, or a copying machine.

Figure 6A:
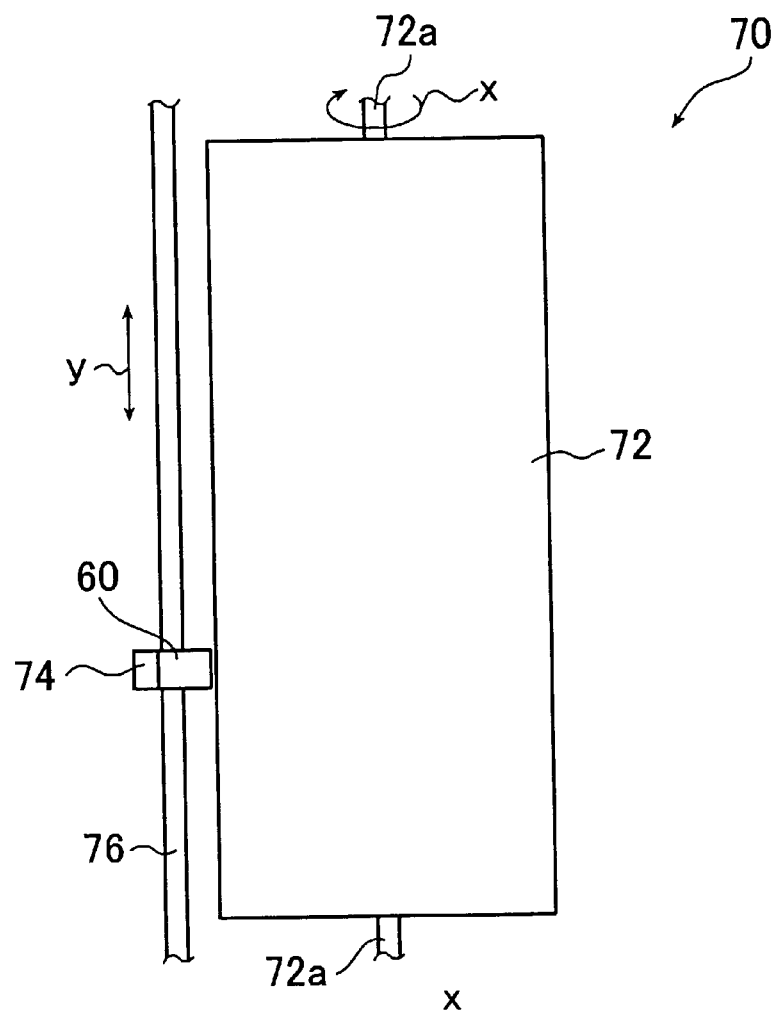
FIGS. 6A and 6B are conceptual drawings showing an example of the image recording apparatus of the present invention.
Figure 6B:
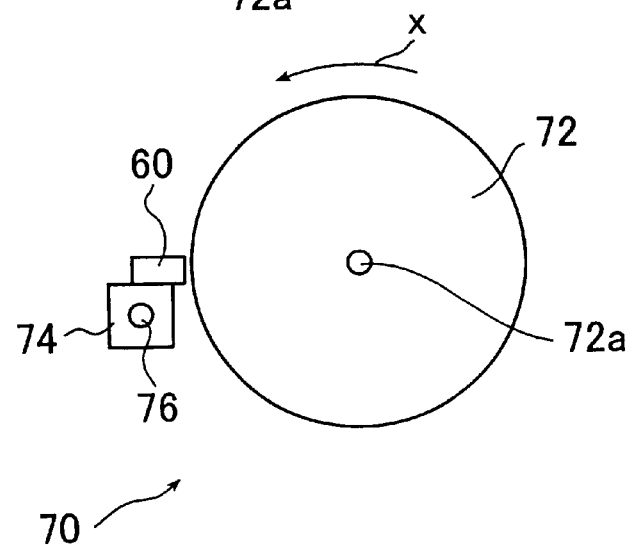
Figure 7:
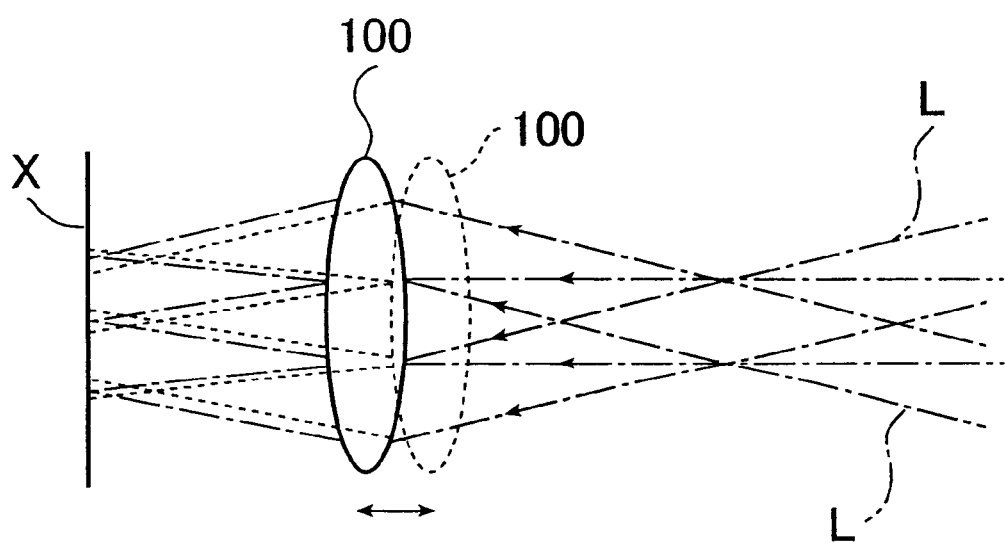
FIG. 7 is a schematic diagram showing the image formation optical system of a conventional multi-channel exposure head.

FIG. 6A and FIG. 6B are conceptual drawings showing an example of an image recording apparatus utilizing the exposure head 60 of the present invention. FIG. 6A is a plan view, and FIG. 6B is a top view.

The image recording apparatus 70 shown in FIGS. 6A and 6B is a so-called drum scanner in which a photosensitive material is wound around a cylindrical drum 72 thereby performing exposure. It is the same as an ordinary drum scanner except for the fact that it uses the exposure head 60 of the present invention. The image recording apparatus 70 has the drum 72, a carriage 74 holding the exposure head of the present invention, and a guide 76 for guiding the carriage 74.

The drum 72, which holds a photosensitive material on its side surface, rotates about a rotation shaft 72a at a predetermined speed, e.g., in the direction indicated by the arrow x. A well-known device can be used to enable the drum 72 to hold the photosensitive material.

The exposure head 60 is held by the carriage 74 such that the scanning direction (the arrangement direction of the lenses 12 indicated by the arrow y) is in conformity with the axis of the drum 72. The carriage 74 is movably held by the guide 76 extending in the scanning direction, and moves in the scanning direction by a well-known device.

In the image recording apparatus 70 like this, the exposure head 60 is moved in the scanning direction thereby performing sub scanning with the carriage 74 while performing main scanning, rotating the drum 72 at a predetermined speed in the direction of the arrow x, and the light beams outgone from the exposure head 60 are modulated, so that the photosensitive material held by the drum 72 is two-dimensionally scanned using the multi-channel exposure head 60 thereby effecting exposure on the photosensitive material.

In the image recording apparatus 70 of the present invention, the focal position of each light beam is properly adjusted on the exposure position (i.e. onto the photosensitive material), so that a high-quality image can be recorded on the material.

In the image recording apparatus of the present invention, exposure may be effected by causing the light beams L from the exposure head 60 to directly be incident on the photosensitive material in the case such as the so-called contact exposure, or the photosensitive material by the light beams L may be exposed by arranging an image formation optical system between the exposure head 60 and the photosensitive material.

The more advantageous of these methods can be selected, depending on fabricating cost, resolution to be objected, a number of channels, image recording time to be objected, etc.

The above-described embodiments of the focal position adjusting apparatus, exposure head, and image recording apparatus of the present invention should not be limited. It is needless to say that various improvements and modifications are possible without departing from the scope of the present invention.

As described in detail above, in accordance with the present invention, focal position can be independently adjusted for each light beam, so that for example, in multi-channel exposure in which a photosensitive material is exposed with a plurality of light beams, image formation is correctly effected at the exposure positions with all the light beams, making it possible to record high-quality image.

Further, the focal position adjusting apparatus of the present invention can be realized using a micro-machine, such as the MEMS utilizing static electricity, so that it is inexpensive and can easily cope with increasing of the number of channels.

What is claimed is:

1. A focal position adjusting apparatus comprising:
   a lens which converges electromagnetic wave to a focal position;
   first electrodes fixed to the lens;
   second electrodes being opposed which spacingly sandwiches each of the first electrodes, in an optical axis direction of the lens; and
   a biasing unit which biases the lens in a direction of an attractive force caused by static electricity between the first electrodes and the second electrodes caused by applying variable voltage to the first electrodes and the second electrodes.

2. The focal position adjusting apparatus according to claim 1, the lens being displaced using the force caused by the static electricity in the optical axis direction thereby adjusting the focal position on which the electromagnetic wave is converged.

3. The focal position adjusting apparatus according to claim 1, the biasing unit being formed by a third electrode arranged on the opposite side of the second electrodes which are sandwiched by the first electrodes.

4. The focal position adjusting apparatus according to claim 1, the biasing unit being formed by an elastic member and a power supply which applies voltage across the first electrodes and the second electrodes and a third electrode.

5. The focal position adjusting apparatus according to claim 1, the first and second electrodes being ring-shaped.

6. The focal position adjusting apparatus according to claim 1 being plurally arranged.

7. The apparatus of claim 1, wherein the first electrodes are flexible.

8. The apparatus of claim 1, wherein the first electrodes are each disposed in a first plane and the second electrodes have planar surfaces, each disposed in a second plane, and wherein the first and second planes each intersect the optical axis of the lens at an angle when no variable voltage is applied by the biasing unit.

9. The apparatus of claim 1, wherein the lens, the first electrodes, the second electrodes and the bias unit are provided in plural.

10. An exposure head comprising a focal position adjusting apparatus being plurally arranged, including:
a lens which converges electromagnetic wave to a focal position;
first electrodes fixed to the lens;
second electrodes being opposed which spacingly sandwiches the first electrodes in an optical axis direction of the lens; and
a biasing unit which biases the lens in a direction of an attractive force caused by static electricity between the first electrodes and the second electrodes caused by applying variable voltage to the first electrodes and the second electrodes, and a light source section which makes light beams incident on one lens or more of the focal position adjusting apparatus and which can modulate each of light beams independently.

11. An image recording apparatus comprising:
an exposure head; and a scanning unit;
the exposure head having a focal position adjusting apparatus being plurally arranged including,
a lens which converges electromagnetic wave to a focal position;
first electrodes fixed to the lens;
second electrodes being opposed which spacingly sandwiches the first electrodes, in an optical axis direction of the lens;
and
a biasing unit which biases the lens in a direction of an attractive force caused by static electricity by applying variable voltage to the first electrodes and the second electrodes, and a light source section which making light beams incident on one lens or more of the focal position adjusting apparatus and which can modulate each of light beams independently, and
the scanning unit displacing a photosensitive material relative to the exposure head.

12. A focal position adjusting apparatus comprising:
a lens which converges electromagnetic wave on a focal position;
first electrodes integrally attached to said lens;
second electrodes, each being opposed to and spaced apart from each of said first electrodes in an optical axis direction of said lens; and
biasing units, each biasing said lens toward a repulsive direction with respect to an attractive force due to static electricity caused in each pair of the first and second electrodes being opposed to each other by applying a variable voltage to said each pair of the first and second electrodes being opposed to each other.

13. The focal position adjusting apparatus according to claim 12, wherein a position of said lens is moved in the optical axis direction using the static electricity caused in said each pair of the first and second electrodes by applying the variable voltage, thereby adjusting said focal position on which said electromagnetic wave is converged.

14. The focal position adjusting apparatus according to claim 12, wherein each of said biasing units includes at least one of an elastic member and a means composed of each of third electrodes arranged on an opposite side of each of said second electrodes being opposed to each of said first electrodes and each of power supplies which applies the voltage to each pair of first and third electrodes.

15. The focal position adjusting apparatus according to claim 14, wherein said elastic member is each of said first electrodes having elasticity or is attached to said focal position adjusting apparatus separately from said each of the first electrodes.

16. The focal position adjusting apparatus according to claim 12, further including voltage-variable driving power supplies, each of which applies said variable voltage to said each pair of the first and second electrodes, and wherein each of said biasing units biases said lens toward the repulsive direction with respect to the attractive force due to the static electricity caused in said each pair of the first and second electrodes by applying the variable voltage from each of said voltage-variable driving power supplies to said each pair of the first and second electrodes.

17. The focal position adjusting apparatus according to claim 12, wherein the first electrodes are flexible.

18. The focal position adjusting apparatus according to claim 12, wherein the first electrodes are each disposed in a first plane and the second electrodes have planar surfaces, each disposed in a second plane, and wherein the first and second planes each intersect the optical axis of the lens at an angle when no variable voltage is applied by the biasing units.

19. The focal position adjusting apparatus according to claim 12, wherein the lens, the first electrodes, the second electrodes and the bias units are provided in plural.

20. An exposure head comprising:
a plurality of focal position adjusting apparatuses, each of which comprises:
a lens which converges electromagnetic wave on a focal position;
first electrodes integrally attached to said lens;
second electrodes, each being opposed to and spaced apart from each of said first electrodes in an optical axis direction of said lens; and
biasing units, each biasing said lens toward a repulsive direction with respect to an attractive force due to static electricity caused in each pair of the first and second electrodes being opposed to each other by applying a variable voltage to said each pair of the first and second electrodes being opposed to each other; and a light source section which makes light beams incident on one or more lenses of said plurality of focal position adjusting apparatuses and which can modulate each of the light beams independently.

21. The exposure head according to claim 20, wherein said focal position adjusting apparatus further comprises voltage-variable driving power supplies, each of which applies said variable voltage to said each pair of the first and second electrodes, and wherein each of said biasing units biases said lens toward the repulsive direction with respect to the attractive force due to the static electricity caused in said each pair of the first and second electrodes by applying the variable voltage from each of said voltage-variable driving power supplies to said each pair of the first and second electrodes.

22. An image recording apparatus comprising an exposure head; and a scanning unit which moves a photosensitive material and said exposure head relative to each other, wherein said exposure head comprises:

a plurality of focal position adjusting apparatuses, each of which comprises:

a lens which converges electromagnetic wave on a focal position; first electrodes integrally attached to said lens;

second electrodes, each being opposed to and spaced apart from each of said first electrodes in an optical axis direction of said lens; and biasing units, each biasing said lens toward a repulsive direction with respect to an attractive force due to static electricity caused in each pair of the first and second electrodes being opposed to each other by applying a variable voltage to said each pair of the first and second electrodes being opposed to each other; and a light source section which makes light beams incident on one or more lenses of said plurality of focal position adjusting apparatuses and which can modulate each of the light beams independently.

23. The image recording apparatus according to claim 22, wherein said focal position adjusting apparatus further comprises voltage-variable driving power supplies, each of which applies said variable voltage to said each pair of the first and second electrodes, and wherein each of said biasing units biases said lens toward the repulsive direction with respect to the attractive force due to the static electricity caused in said each pair of the first and second electrodes by applying the variable voltage from each of said voltage-variable driving power supplies to said each pair of the first and second electrodes.

* * * * *